(12) United States Patent
Huang et al.

(10) Patent No.: US 12,253,049 B2
(45) Date of Patent: Mar. 18, 2025

(54) HYPERSONIC LARGE INTERNAL CONTRACTION RATIO AIR INLET CHANNEL HAVING STEPLESS ADJUSTABLE AIR RELEASE VALVE AND CONTROL METHOD

(71) Applicants: NANJING UNIVERSITY OF AERONAUTICS AND ASTRONAUTICS, Jiangsu (CN); BEIJING AEROSPACE TECHNOLOGY INSTITUTE, Beijing (CN)

(72) Inventors: Hexia Huang, Jiangsu (CN); Zhengkang Lin, Jiangsu (CN); Xuebin Tang, Jiangsu (CN); Yuan Qin, Jiangsu (CN); Huijun Tan, Jiangsu (CN); Hang Zhang, Beijing (CN); Ziren Wang, Beijing (CN); Chao Li, Beijing (CN); Xiru Xu, Beijing (CN)

(73) Assignees: NANJING UNIVERSITY OF AERONAUTICS AND ASTRONAUTICS, Jiangsu (CN); BEIJING AEROSPACE TECHNOLOGY INSTITUTE, Beijing (CN)

( * ) Notice: Subject to any disclaimer, the term of this patent is extended or adjusted under 35 U.S.C. 154(b) by 42 days.

(21) Appl. No.: 18/556,356
(22) PCT Filed: Mar. 21, 2022
(86) PCT No.: PCT/CN2022/081946
§ 371 (c)(1),
(2) Date: Oct. 20, 2023
(87) PCT Pub. No.: WO2022/222661
PCT Pub. Date: Oct. 27, 2022

(65) Prior Publication Data
US 2024/0174371 A1 May 30, 2024

(30) Foreign Application Priority Data
Apr. 21, 2021 (CN) .......................... 202110428018.1

(51) Int. Cl.
F02K 7/10 (2006.01)
B64D 33/02 (2006.01)
F02C 7/042 (2006.01)

(52) U.S. Cl.
CPC ................ *F02K 7/10* (2013.01); *B64D 33/02* (2013.01); *F02C 7/042* (2013.01); *B64D 2033/026* (2013.01)

(58) Field of Classification Search
CPC ...... F02C 7/042; F02K 7/10; B64D 2033/026
See application file for complete search history.

(56) References Cited

U.S. PATENT DOCUMENTS 2,950,594 A * 8/1960 Mitrovich ............... F02C 7/042
244/74
2,971,331 A * 2/1961 Silverman ............... F02C 7/042
137/15.1

(Continued)

FOREIGN PATENT DOCUMENTS

CN 103950543 7/2014
CN 107091158 8/2017

(Continued)

OTHER PUBLICATIONS

"International Search Report (Form PCT/ISA/210) of PCT/CN2022/081946", mailed on Jun. 8, 2022, with English translation thereof, pp. 1-5.

*Primary Examiner* — Lorne E Meade
(74) *Attorney, Agent, or Firm* — JCIPRNET

(57) ABSTRACT

The present invention provides a hypersonic large internal contraction ratio air inlet channel having stepless adjustable air release valve, including an air inlet channel front body, an air-discharging slit cover plate, sidewalls, a lip cover, air-discharging cavities, valve plates, partition plates, a rotatable shaft, an expansion section and a driver. The valve plates are rotated through the driver according to the actual (Continued)

working conditions of air inlet channel, the minimum cross-section of the air discharging flow path is thus changed, and a stepless dynamic adjustment of the air discharging flow of the air inlet channel can be realized, so that the aerodynamic performance of the air inlet channel is improved, and the air discharging resistance of the air vehicle is reduced.

20 Claims, 3 Drawing Sheets

(56) References Cited

U.S. PATENT DOCUMENTS

| | | | | |
|---|---|---|---|---|
| 3,062,484 A | * | 11/1962 | Himka | F02C 7/04 |
| | | | | 415/121.2 |
| 3,417,767 A | * | 12/1968 | Young | F02C 7/042 |
| | | | | 137/15.2 |
| 3,439,692 A | * | 4/1969 | Roy | F02C 7/042 |
| | | | | 137/15.2 |
| 4,000,869 A | | 1/1977 | Wong et al. | |
| 4,007,891 A | * | 2/1977 | Sorensen | B64D 33/02 |
| | | | | 137/15.1 |
| 4,502,651 A | * | 3/1985 | Jungclaus | F02C 7/04 |
| | | | | 137/15.1 |
| 4,754,923 A | * | 7/1988 | Matusita | B05B 7/12 |
| | | | | 239/67 |
| 2003/0034066 A1 | | 2/2003 | Sanders et al. | |

FOREIGN PATENT DOCUMENTS

| | | |
|---|---|---|
| CN | 113074048 | 7/2021 |
| CN | 113107680 | 7/2021 |
| JP | 2000192823 | 7/2000 |

* cited by examiner

HYPERSONIC LARGE INTERNAL CONTRACTION RATIO AIR INLET CHANNEL HAVING STEPLESS ADJUSTABLE AIR RELEASE VALVE AND CONTROL METHOD

CROSS-REFERENCE TO RELATED APPLICATION

This application is a 371 of international application of PCT application serial no. PCT/CN2022/081946, filed on Mar. 21, 2022, which claims the priority benefit of China application serial no. 202110428018.1, filed on Apr. 21, 2021. The entirety of each of the above-mentioned patent applications is hereby incorporated by reference herein and made a part of this specification.

TECHNICAL FIELD

The present invention relates to the field of air inlet channel of hypersonic vehicle, and in particular to a hypersonic large internal contraction ratio air inlet channel having stepless adjustable air release valve and a control method.

RELATED ART

As one of key aerodynamic components of an air-breathing hypersonic propulsion system, a hypersonic air inlet channel performs functions of flow capture and regulation, conversion and utilization of incoming flow energy, etc., which directly affect operating efficiency and operating envelope of the propulsion system. In addition, analyses reveal that more than 50% of the total thrust of a ramjet engine operating at high Mach numbers comes from a complex air inlet and discharging system, therefore, the performance of the hypersonic air inlet channel is critical to efficient and stable operation of a hypersonic vehicle in a wide speed range.

Flow capture and regulation, conversion and utilization of incoming flow energy by the air inlet channel usually involve external compression based on changes in an outer profile of the air inlet channel and internal compression based on changes in an inner flow channel of the air inlet channel. In order to minimize flight resistance of the hypersonic vehicle, the air inlet channel is often designed with low external resistance. However, the external compression of the air inlet channel using such design decreases to some extent. For the hypersonic air inlet channel with relatively great inlet and outlet deceleration, it is necessary to increase the internal compression to meet the actual application requirements, which leads to an increase in the internal contraction ratio of the air inlet channel. Internal contraction ratio is defined as the ratio of the cross-sectional area of an intake port of the air inlet channel to the cross-sectional area of a throat of the air inlet channel. A large internal contraction ratio can significantly improve the aerodynamic performance of the air inlet channel, such as the total outlet pressure recovery coefficient and the anti-back pressure performance, which are also the two most important performance indicators in the design process of the air inlet channel. However, an excessively large internal contraction ratio will make the throat of the air inlet channel congested, thereby making the air inlet channel unable to start automatically at the lowest operating Mach number, and the air inlet channel thus enters a non-starting state. Non-starting of the air inlet channel will seriously affect normal operation of the propulsion system, and may even lead to the overall failure of a flight mission. In addition, in the starting state of the air inlet channel, since the deceleration and boosting of the inlet and outlet airflow need to be completed through oblique shock wave boosting, normal shock wave boosting and subsonic boosting, etc., the hypersonic air inlet channel faces very complex problem of shock wave/boundary layer interaction. Severe shock wave/boundary layer interaction induces flow separation, weakening the performance of the air inlet channel, such as a decrease in the total pressure recovery coefficient, an increase in the total pressure distortion index, and a decrease in the subcritical stability margin. Therefore, from the perspective of the future development trend of the hypersonic air inlet channel, increasing the internal contraction ratio of the air inlet channel becomes the best choice, so as to improve the aerodynamic performance of the air inlet channel. However, the air inlet channel still needs to widen its operating boundary. To this end, how to balance the contradiction between the aerodynamic performance and the starting (operating boundary) performance of the air inlet channel after an increasing in the internal contraction ratio becomes a key issue to be solved urgently at present.

SUMMARY OF INVENTION

Technical Problem

In order to solve the above problem, the present invention provides a hypersonic large internal contraction ratio air inlet channel having stepless adjustable air release valve, which can achieve a stepless dynamic adjustment of the air discharging flow of the air inlet channel in a wind tunnel test, and feature simple structure, easy to install and implement.

Solution to Problem

In order to achieve the above objective, the present invention uses the following technical solution:

a hypersonic large internal contraction ratio air inlet channel having stepless adjustable air release valve, including an air inlet channel front body, an air-discharging slit cover plate extending backwards from the air inlet channel front body, a lip cover disposed on the air-discharging slit cover plate, sidewalls disposed on two sides of the lip cover; the air inlet channel front body, the air-discharging slit cover plate, the lip cover and the sidewalls on the two sides together form an inner flow channel of the air inlet channel; a plurality of air-discharging cavities are arranged from front to back inside the air-discharging slit cover plate, the adjacent air-discharging cavities are separated by a partition plate, and a plurality of air-discharging slits that connect the air-discharging cavities to the inner flow channel are disposed on the air-discharging slit cover plate; the lower half of each air-discharging cavity has an air-discharging channel laterally penetrating the sidewalls; an opening adjustment apparatus is further provided, the opening adjustment apparatus includes a driver, a rotatable shaft extending from the driver, and valve plates disposed in each air-discharging channel, where the valve plates are mounted on the rotatable shaft and are rotated by means of the rotatable shaft, and the valve plates are rotated between open and closed positions; when the valve plates are rotated to the open position, the air-discharging cavities are communicated with the outside; when the valve plates are rotated to the closed position, the air-discharging cavities are closed by the valve plates.

Further, the rotatable shaft passes through the partition plates in sequence, and the driver is disposed behind the air-discharging cavities.

Further, the outer part of the partition plate extends backwards obliquely, so that an air discharging direction of the air-discharging channel is a direction obliquely backwards.

Further, the air-discharging channels are distributed on both sides of the air inlet channel in a spanwise direction, and are symmetrical about the spanwise symmetry plane; the valve plates at the outlet on the same side share one driver; and the control rules of the drivers on both sides are consistent.

Further, the air-discharging slit cover plate is disposed upstream of a throat section of the air inlet channel, the front edge thereof is connected to the air inlet channel front body, and the rear edge thereof is connected to the expansion section; and front and rear profiles of the upper surface of the air-discharging slit cover plate are tangent to the profiles of the air inlet channel front body and the expansion section, respectively.

Further, the air-discharging slit cover plate is provided with different air-discharging areas in a flow direction; and the width and length, number and spanwise profile distribution rule of the air-discharging slits in each air-discharging area depend on the specific application requirements:
when the air inlet channel focuses on the starting performance, the air-discharging areas are arranged upstream of a shock wave incident ray of the lip cover and close to the inlet of the air inlet channel; and
when the air inlet channel focuses on the aerodynamic performance, the air-discharging areas are arranged near the shock wave incident ray.

Further, the throat section of the air inlet channel is disposed in the inner flow channel of the air inlet channel downstream the air-discharging slit cover plate.

Further, positioning holes are formed on the partition plates for the rotatable shaft to pass through, and centers of the positioning holes are disposed at the smallest cross-section of the air-discharging channel; the minimum cross-sectional heights of all air-discharging channels are the same, and the distance between the positioning hole and the lower wall surface of the air-discharging cavities is half of the minimum cross-sectional heights.

Further, the driver is a drive motor, and the valve plates are symmetrical about the center of the rotatable shaft.

Effects of Invention

The present invention further provides a technical method for a control method of the above hypersonic large internal contraction ratio air inlet channel: the valve plates are kept parallel to lower wall surfaces of the air-discharging cavities, and at this time, the air discharging flow of the air inlet channel is the maximum, so as to realize self-starting of the air inlet channel; after the air inlet channel realizes the self-starting, the valve plates rotate and the rotational angle ranges from 0°-90°, and at this time, the air discharging flow of the air inlet channel gradually decreases with the rotational angle.

DESCRIPTION OF EMBODIMENTS

Figure 1:
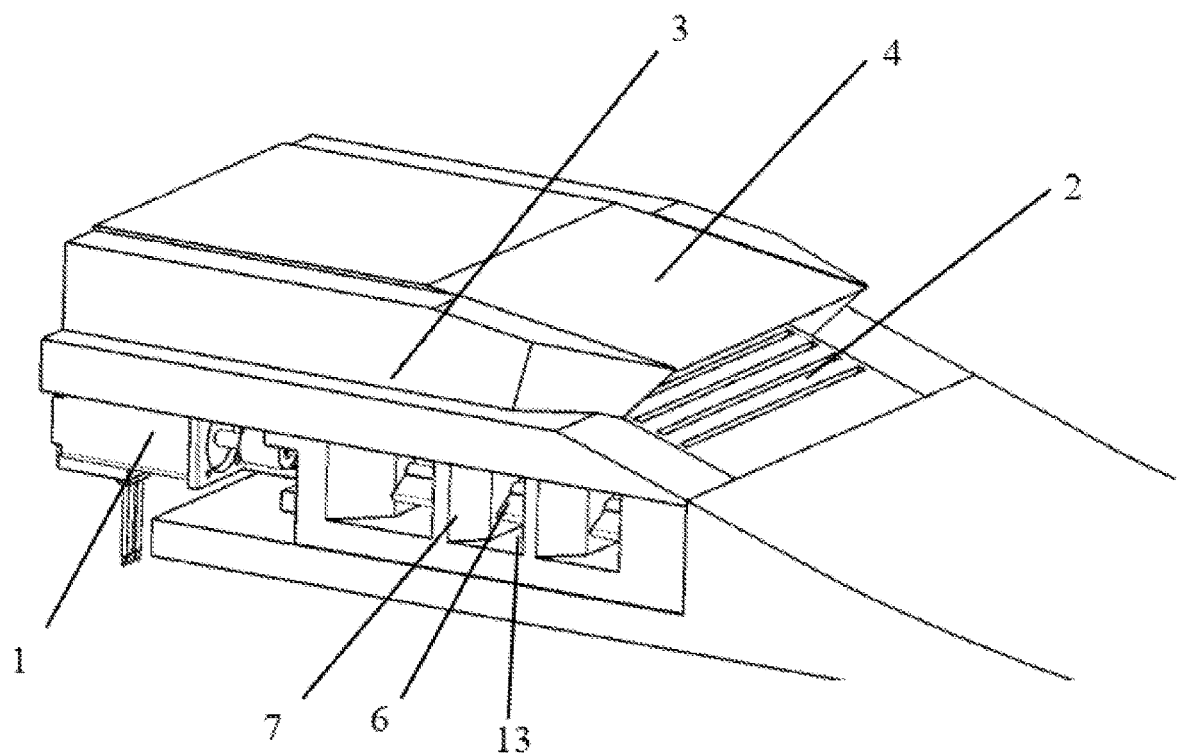
FIG. 1 is a perspective view of a hypersonic large internal contraction ratio air inlet channel having stepless adjustable air release valve according to the present invention.
Figure 2:
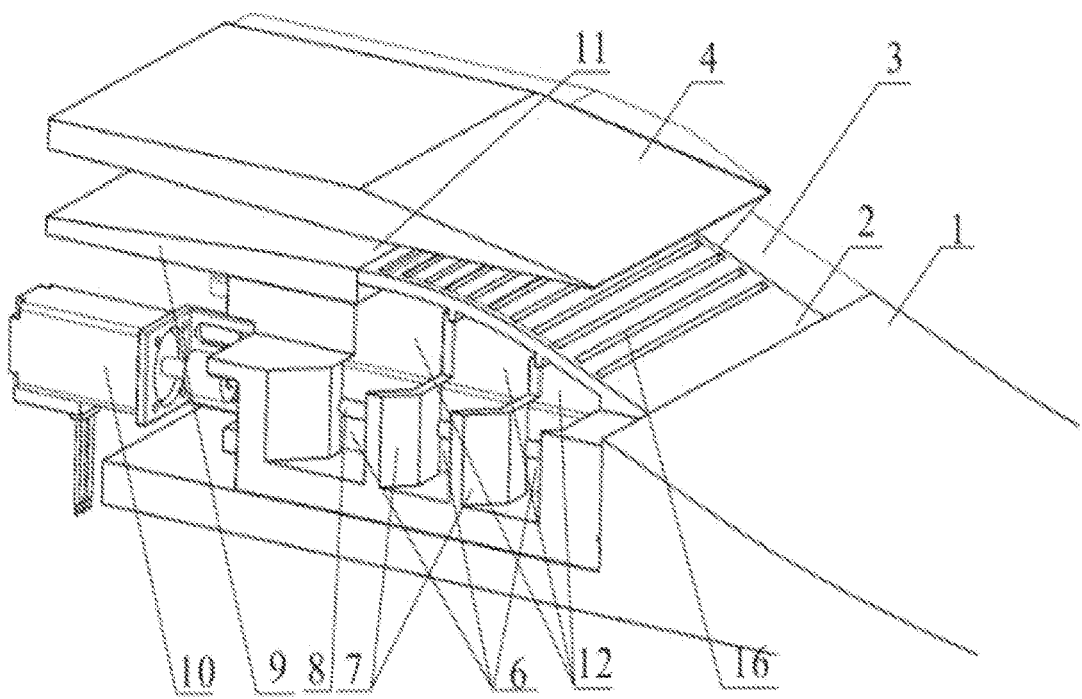
FIG. 2 is a schematic diagram of FIG. 1 with one sidewall of the air inlet channel hidden, and shows the state when a valve plate is closed.
Figure 3:
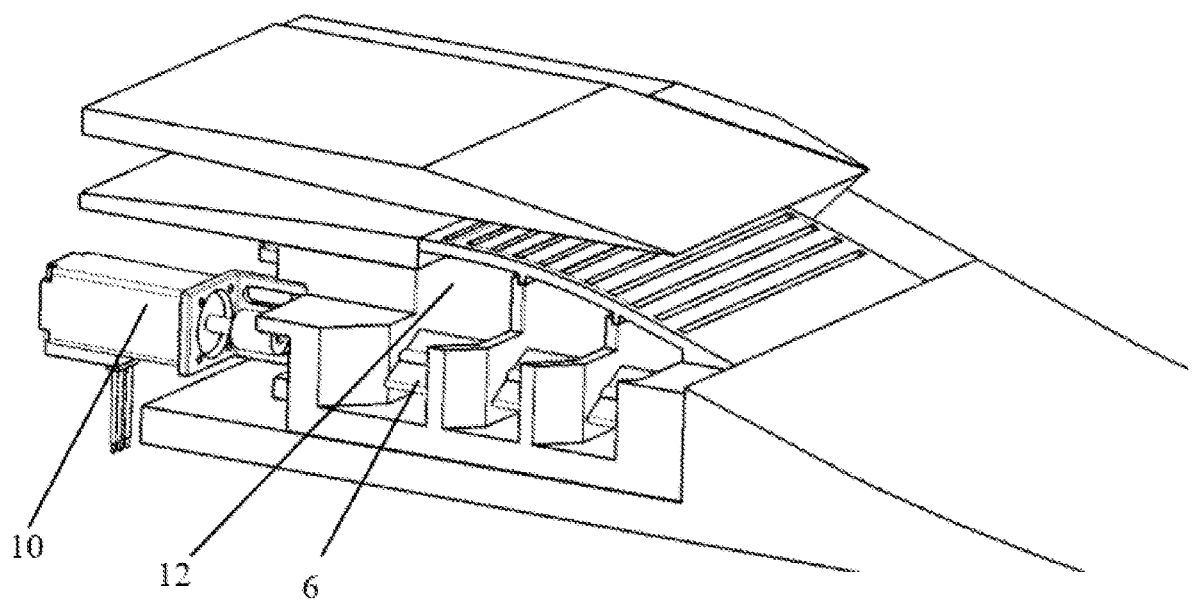
FIG. 3 is a schematic diagram of FIG. 1 with one sidewall of the air inlet channel hidden, and shows the state when a valve plate is opened at an angle.
Figure 4:
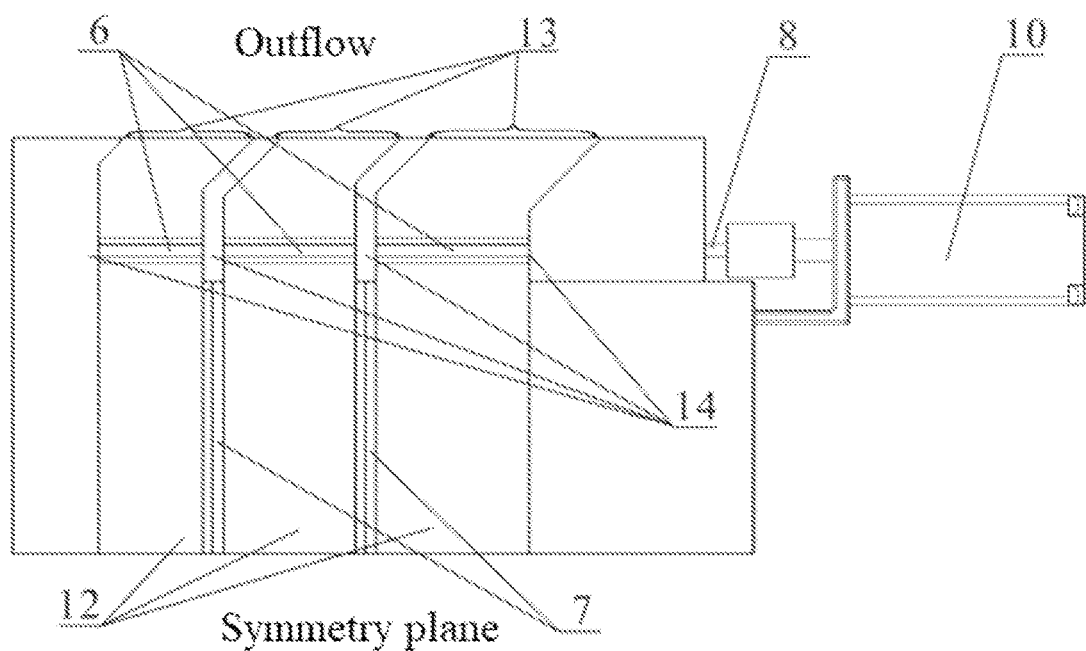
FIG. 4 is a schematic diagram for mounting a driver on air-discharging cavities.

The present invention discloses a hypersonic large internal contraction ratio air inlet channel having stepless adjustable air release valve.

With reference to FIGS. 1-5, the hypersonic large internal contraction ratio air inlet channel includes an air inlet channel front body 1, an air-discharging slit cover plate 2 extending backwards from the air inlet channel front body 1, a lip cover 4 disposed on the air-discharging slit cover plate 2, sidewalls 3 disposed on two sides of the lip cover 4, and an expansion section 9 extending backwards from the air release slot cover plate 2. The air-discharging slit cover plate 2 is disposed upstream of a throat section 11 of the air inlet channel, the front edge thereof is connected to the air inlet channel front body 1, and the rear edge thereof is connected to the expansion section 9; and front and rear profiles of the upper surface of the air-discharging slit cover plate 2 are tangent to the profiles of the air inlet channel front body 1 and the expansion section 9, respectively. The air inlet channel front body 1, the air-discharging slit cover plate 2, the lip cover 4 and the sidewalls 3 on the two sides together form an inner flow channel of the air inlet channel. A plurality of air-discharging cavities 12 are arranged from front to back inside the air-discharging slit cover plate 2, the adjacent air-discharging cavities 12 are separated by a partition plate 7, and a plurality of air-discharging slits 16 that connects the air-discharging cavities 12 to the inner flow channel are disposed on the air-discharging slit cover plate 2. The lower half of each air-discharging cavity 12 has an air-discharging channel 13 laterally penetrating the sidewalls.

Figure 5:
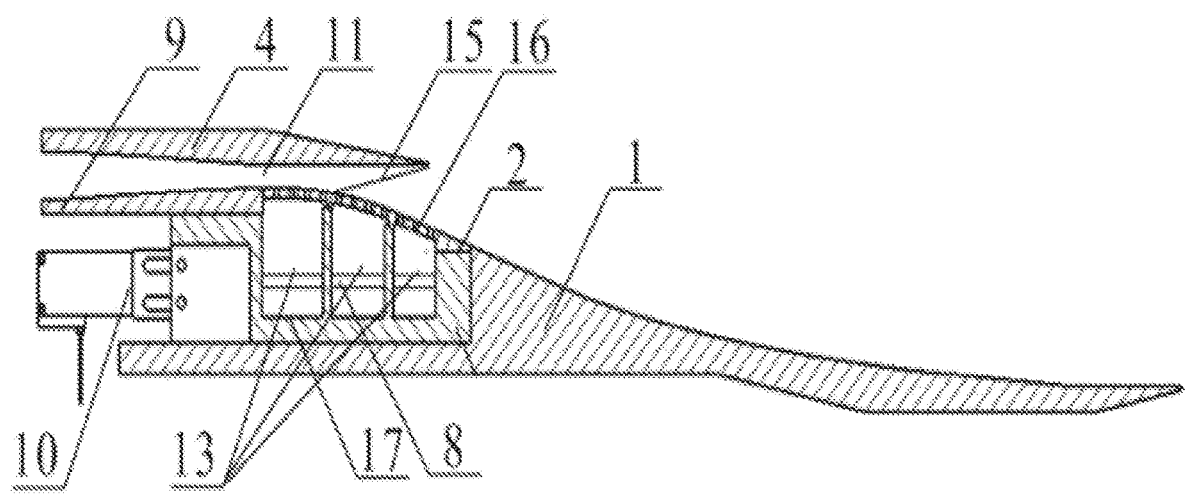
FIG. 5 is a cross-sectional view of a hypersonic large internal contraction ratio air inlet channel having stepless adjustable air release valve in FIG. 1.

With reference to FIG. 5, the air-discharging slit cover plate 2 is provided with different air-discharging areas in a flow direction. The width and length, number and spanwise profile distribution rule of the air-discharging slits 16 in each air-discharging area depend on the specific application requirements:
when the air inlet channel focuses on the starting performance, the air-discharging areas are arranged upstream of a shock wave incident ray 15 of the lip cover and close to the inlet of the air inlet channel, and the width and number of the air-discharging slits 16 are designed according to the requirements of the starting Mach numbers of the air inlet channel;
when the air inlet channel focuses on the aerodynamic performance, the air-discharging areas are arranged near the shock wave incident ray 15, the width and number of the air-discharging slits 16 according to the characteristic size of the air inlet channel, and the spanwise profile distribution rule thereof is consistent with that of the shock wave incident ray 15; and
when the air inlet channel focuses on the aerodynamic performance in a wide range, the air-discharging areas are arranged according to the above rules.

In the present embodiment, the outer part of the partition plate 7 extends backwards obliquely, so that an air discharging direction of the air-discharging channel 13 is a direction obliquely backwards, that is, airflow in the air-discharging channel 13 is discharged obliquely backwards, such that no airflow will flow back into the air-discharging channel 13 when an air vehicle flies forwards, thereby maximizing the role of the air-discharging channel 13 in regulating the air inlet channel.

The opening size of the air-discharging channel 13 is adjusted by providing an opening adjustment apparatus. The opening adjustment apparatus includes a driver 10, a rotatable shaft 8 extending from the driver 10, and valve plates 6 disposed in each air-discharging channel 13. The driver 10 is preferably a drive motor. The valve plates 6 are symmetrical about the center of the rotatable shaft 8 to reduce the rotational torque arising from air discharging, and reduce the operating power of the drive motor.

The rotatable shaft 8 passes through the partition plates 7 in sequence, and the driver 10 is disposed behind the air-discharging cavities 12. The valve plates 6 are mounted on the rotatable shaft 8 and are rotated by means of the rotatable shaft 8, and the valve plates 6 rotate between open and closed positions. When the valve plates 6 rotate to the open position, the air-discharging cavities 12 communicate with the outside; when the valve plates 6 rotate to the closed position, the air-discharging cavities 12 are closed by the valve plates 6. The rotatable shaft 8 and the valve plates 6 are concentric with positioning holes 14 on the partition plates 7. The valve plates 6 are symmetrical about the center of the rotatable shaft 8 to reduce the rotational torque arising from air discharging, and reduce the operating power of the motor; and the rotatable shaft is parallel to lower wall surfaces 17 of the air-discharging cavities, where centers of the positioning holes 14 are disposed at the smallest cross-section of the air-discharging channel 13. The minimum cross-sectional heights of all air-discharging channels 13 are the same, and the distance between the positioning hole 14 and the lower wall surface 17 of the air-discharging cavities 12 is half of the minimum cross-sectional heights.

The air-discharging channels 13 are distributed on both sides of the air inlet channel in a spanwise direction, and are symmetrical about the spanwise symmetry plane. The valve plates 6 at the outlet on the same side share one driver 10. The control rules of the drivers 10 on both sides are consistent.

When the air inlet channel of the air vehicle is working, a control method for the air inlet channel of the hypersonic large internal contraction ratio air inlet channel is as follows: keeping the valve plates 6 parallel to lower wall surfaces of the air-discharging cavities, and at this time, the air discharging flow of the air inlet channel is the maximum, so as to realize self-starting of the air inlet channel. After the air inlet channel realizes the self-starting, the valve plates 6 rotate and the rotational angle ranges from 0°–90°, and at this time, the air discharging flow of the air inlet channel gradually decreases with the rotational angle. The rotation of the rotatable shaft 8 can be adjusted at any angle through the driver 10, the rotation of the valve plates 6 can also be adjusted at any angle, and therefore a stepless dynamic adjustment of the air discharging flow of the air inlet channel can be realized. Since the whole set of opening adjustment apparatus has a simple structure, and the adjustment of the air discharging flow can be realized without using a complicated air inlet body adjustment apparatus, which can solve the prominent conflict between aerodynamic performance and starting performance of the hypersonic air inlet channel to some extent.

In addition, there are a wide range of methods and ways to implement the present invention, and what is described above is merely preferred implementations of the present invention. It should be pointed out that those of ordinary skill in the art may also make some improvements and modifications without departing from the principle of the present invention, and these improvements and modifications should also fall within the scope of protection of the present invention.

What is claimed is:

1. A hypersonic large internal contraction ratio air inlet channel having a stepless adjustable air release valve, comprising:
   an air inlet channel front body;
   an air-discharging slit cover plate extending backwards from the air inlet channel front body;
   a lip cover disposed on the air-discharging slit cover plate, sidewalls disposed on two sides of the lip cover;
   the air inlet channel front body, the air-discharging slit cover plate, the lip cover and the sidewalls on the two sides together form an inner flow channel of the air inlet channel;
   wherein a plurality of adjacent air-discharging cavities are arranged from front to back inside the air-discharging slit cover plate, the plurality of adjacent air-discharging cavities are separated by a partition plate, and a plurality of air-discharging slits disposed in the air-discharging slit cover plate connect the plurality of adjacent air-discharging cavities to the inner flow channel;
   a lower half of each one of the plurality of adjacent air-discharging cavities has an air-discharging channel laterally penetrating both of the sidewalls; and
   the stepless adjustable air release valve comprises:
      a driver;
      a rotatable shaft extending from the driver; and
      a plurality of valve plates with a respective one of the plurality of valve plates disposed in each air-discharging channel, wherein the plurality of valve plates are mounted on the rotatable shaft and are rotated by means of the rotatable shaft between open and closed positions;
      when the plurality of valve plates are rotated to the open position, the plurality of adjacent air-discharging cavities are communicated with the outside; and
      when the plurality of valve plates are rotated to the closed position, the plurality of adjacent air-discharging cavities are closed by the plurality of valve plates.

2. The hypersonic large internal contraction ratio air inlet channel having stepless adjustable air release valve according to claim 1, wherein the rotatable shaft passes through the partition plates in sequence, and the driver is disposed behind the plurality of adjacent air-discharging cavities.

3. The hypersonic large internal contraction ratio air inlet channel having stepless adjustable air release valve according to claim 2, wherein an outer part of the partition plate extends backwards obliquely, so that an air discharging direction of the air-discharging channels are in a direction obliquely backwards.

4. The hypersonic large internal contraction ratio air inlet channel having stepless adjustable air release valve according to claim 2, wherein the air-discharging channels are distributed on both sides of the air inlet channel in a spanwise direction, and are symmetrical about a spanwise symmetry plane; the plurality of valve plates at an outlet on the same side share one driver; and control rules of the drivers on both sides are consistent.

5. The hypersonic large internal contraction ratio air inlet channel having stepless adjustable air release valve according to claim 2, wherein the air-discharging slit cover plate is disposed upstream of a throat section of the air inlet channel, a front edge of the air-discharging slit cover plate is connected to the air inlet channel front body, and a rear edge of the air-discharging slit cover plate is connected to an expansion section; and front and rear profiles of an upper surface of the air-discharging slit cover plate are tangent to profiles of the air inlet channel front body and the expansion section, respectively.

6. The hypersonic large internal contraction ratio air inlet channel having stepless adjustable air release valve according to claim 2, wherein a throat section of the air inlet channel is disposed in the inner flow channel of the air inlet channel downstream from the air-discharging slit cover plate.

7. The hypersonic large internal contraction ratio air inlet channel having stepless adjustable air release valve according to claim 2, wherein the driver is a drive motor, and the plurality of valve plates are symmetrical about the center of the rotatable shaft.

8. A control method of the hypersonic large internal contraction ratio air inlet channel according to claim 2, wherein the plurality of valve plates are kept parallel to lower wall surfaces of each one of the plurality of adjacent air-discharging cavities, and at this time, the air discharging flow of the air inlet channel is the maximum, so as to realize self-starting of the air inlet channel;
after the air inlet channel realizes the self-starting, the plurality of valve plates rotate and the rotational angle ranges from 0°-90°, and at this time, the air discharging flow of the air inlet channel gradually decreases with the rotational angle.

9. The hypersonic large internal contraction ratio air inlet channel having stepless adjustable air release valve according to claim 1, wherein an outer part of the partition plate extends backwards obliquely, so that an air discharging direction of the air-discharging channels are in a direction obliquely backwards.

10. A control method of the hypersonic large internal contraction ratio air inlet channel according to claim 9, wherein the plurality of valve plates are kept parallel to lower wall surfaces of each one of the plurality of adjacent air-discharging cavities, and at this time, the air discharging flow of the air inlet channel is the maximum, so as to realize self-starting of the air inlet channel;
after the air inlet channel realizes the self-starting, the plurality of valve plates rotate and the rotational angle ranges from 0°-90°, and at this time, the air discharging flow of the air inlet channel gradually decreases with the rotational angle.

11. The hypersonic large internal contraction ratio air inlet channel having stepless adjustable air release valve according to claim 1, wherein the air-discharging channels are distributed on both sides of the air inlet channel in a spanwise direction, and are symmetrical about a spanwise symmetry plane; the plurality of valve plates at an outlet on the same side share one driver; and control rules of the drivers on both sides are consistent.

12. A control method of the hypersonic large internal contraction ratio air inlet channel according to claim 11, wherein the plurality of valve plates are kept parallel to lower wall surfaces of each one of the plurality of adjacent air-discharging cavities, and at this time, the air discharging flow of the air inlet channel is the maximum, so as to realize self-starting of the air inlet channel;
after the air inlet channel realizes the self-starting, the plurality of valve plates rotate and the rotational angle ranges from 0°-90°, and at this time, the air discharging flow of the air inlet channel gradually decreases with the rotational angle.

13. The hypersonic large internal contraction ratio air inlet channel having stepless adjustable air release valve according to claim 1, wherein the air-discharging slit cover plate is disposed upstream of a throat section of the air inlet channel, a front edge of the air-discharging slit cover plate is connected to the air inlet channel front body, and a rear edge of the air-discharging slit cover plate is connected to an expansion section; and front and rear profiles of an upper surface of the air-discharging slit cover plate are tangent to profiles of the air inlet channel front body and the expansion section, respectively.

14. A control method of the hypersonic large internal contraction ratio air inlet channel according to claim 13, wherein the plurality of valve plates are kept parallel to lower wall surfaces of each one of the plurality of adjacent air-discharging cavities, and at this time, the air discharging flow of the air inlet channel is the maximum, so as to realize self-starting of the air inlet channel;
after the air inlet channel realizes the self-starting, the plurality of valve plates rotate and the rotational angle ranges from 0°-90°, and at this time, the air discharging flow of the air inlet channel gradually decreases with the rotational angle.

15. The hypersonic large internal contraction ratio air inlet channel having stepless adjustable air release valve according to claim 1, wherein a throat section of the air inlet channel is disposed in the inner flow channel of the air inlet channel downstream from the air-discharging slit cover plate.

16. A control method of the hypersonic large internal contraction ratio air inlet channel according to claim 15, wherein the plurality of valve plates are kept parallel to lower wall surfaces of each one of the plurality of adjacent air-discharging cavities, and at this time, the air discharging flow of the air inlet channel is the maximum, so as to realize self-starting of the air inlet channel;
after the air inlet channel realizes the self-starting, the plurality of valve plates rotate and the rotational angle ranges from 0°-90°, and at this time, the air discharging flow of the air inlet channel gradually decreases with the rotational angle.

17. The hypersonic large internal contraction ratio air inlet channel having stepless adjustable air release valve according to claim 1, wherein positioning holes are formed on the partition plates for the rotatable shaft to pass through, and centers of the positioning holes are disposed at the smallest cross-section of the air-discharging channel;
the minimum cross-sectional heights of all the air-discharging channels are the same, and a distance between the positioning hole and the lower wall surface of each one of the plurality of adjacent air-discharging cavities is half of the minimum cross-sectional heights.

18. A control method of the hypersonic large internal contraction ratio air inlet channel according to claim 17, wherein the plurality of valve plates are kept parallel to lower wall surfaces of each one of the plurality of adjacent air-discharging cavities, and at this time, the air discharging flow of the air inlet channel is the maximum, so as to realize self-starting of the air inlet channel;

after the air inlet channel realizes the self-starting, the plurality of valve plates rotate and the rotational angle ranges from 0°-90°, and at this time, the air discharging flow of the air inlet channel gradually decreases with the rotational angle.

19. The hypersonic large internal contraction ratio air inlet channel having stepless adjustable air release valve according to claim 1, wherein the driver is a drive motor, and the plurality of valve plates are symmetrical about the center of the rotatable shaft.

20. A control method of the hypersonic large internal contraction ratio air inlet channel according to claim 1, wherein the plurality of valve plates are kept parallel to lower wall surfaces of each one of the plurality of adjacent air-discharging cavities, and at this time, the air discharging flow of the air inlet channel is the maximum, so as to realize self-starting of the air inlet channel;

after the air inlet channel realizes the self-starting, the plurality of valve plates rotate and the rotational angle ranges from 0°-90°, and at this time, the air discharging flow of the air inlet channel gradually decreases with the rotational angle.

\* \* \* \* \*